United States Patent
DeVoe et al.

(10) Patent No.: US 10,421,495 B2
(45) Date of Patent: Sep. 24, 2019

(54) COMPRESSIBLE STOPPER BEHIND HEADLAMP FOR PROTECTING CLOSURES AGAINST DAMAGE DURING A LOW SPEED COLLISION

(71) Applicant: FORD GLOBAL TECHNOLOGIES, LLC, Dearborn, MI (US)

(72) Inventors: Aileen M. DeVoe, Royal Oak, MI (US); Rajarathinam Jayachandran, Canton, MI (US); Paul Ribai, Lapeer, MI (US); Bhimaraddi Venkaraddi Alavandi, Canton, MI (US); Erika Kristin Low, Ann Arbor, MI (US); Oliver O. Nwankwo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 15/279,517

(22) Filed: Sep. 29, 2016

(65) Prior Publication Data

US 2018/0086384 A1  Mar. 29, 2018

(51) Int. Cl.
*B62D 21/15* (2006.01)
*B60Q 1/04* (2006.01)

(52) U.S. Cl.
CPC ......... *B62D 21/155* (2013.01); *B60Q 1/0483* (2013.01); *B60Q 1/0491* (2013.01)

(58) Field of Classification Search
CPC ... B60Q 1/0483; B60Q 1/0491; B62D 21/155
USPC .................................................. 296/187.04
See application file for complete search history.

(56) References Cited

U.S. PATENT DOCUMENTS

| 5,597,232 | A  | * | 1/1997 | Ohashi | B60Q 1/0088 |
| | | | | | 362/265 |
| 7,156,545 | B2 | * | 1/2007 | Arlon | B60Q 1/0491 |
| | | | | | 362/306 |
| 8,814,394 | B2 | * | 8/2014 | Aquilina | B60Q 1/0483 |
| | | | | | 362/362 |
| 9,221,387 | B1 | * | 12/2015 | Thorpe | B60Q 1/0491 |
| 9,333,989 | B2 | | 5/2016 | Donabedian et al. | |
| 2011/0210579 | A1 | | 9/2011 | Marur et al. | |
| 2014/0313764 | A1 | | 10/2014 | Gelfi et al. | |
| 2015/0003101 | A1 | | 1/2015 | Nemoto | |

(Continued)

FOREIGN PATENT DOCUMENTS

DE   19926346 A1   12/2000
DE   202015100288 U1   3/2015

OTHER PUBLICATIONS

English Machine Translation of DE19926346A1.
English Machine Translation of DE202015100288U1.

*Primary Examiner* — Joseph D. Pape
*Assistant Examiner* — Dana D Ivey
(74) *Attorney, Agent, or Firm* — Jason Rogers; Vichit Chea; King & Schickli, PLLC (57) ABSTRACT

An apparatus for protecting against damage to a vehicle during a low speed collision. The apparatus includes a headlamp adapted to breakaway to provide the vehicle with front end compliance for pedestrian protection. To avoid causing further damage to vehicle components during the low speed collision, a compressible stopper, such as a foam block, is provided for simultaneously engaging the headlamp and a component of the vehicle during the rearward movement of the headlamp as a result of the collision. Related methods are also disclosed.

17 Claims, 7 Drawing Sheets

(56) References Cited

U.S. PATENT DOCUMENTS

2015/0353002 A1  12/2015  Ahmed et al.
2015/0375793 A1* 12/2015  Donabedian .......... B62D 21/02
                                              296/187.09

* cited by examiner

COMPRESSIBLE STOPPER BEHIND HEADLAMP FOR PROTECTING CLOSURES AGAINST DAMAGE DURING A LOW SPEED COLLISION

TECHNICAL FIELD

This document relates generally to the motor vehicle field and, more particularly, to a vehicle with a stopper for protecting against a headlamp causing damage to closures such as a fender or door, during a low speed collision.

BACKGROUND

Motor vehicles, such as passenger cars, may be designed to allow a headlamp to breakaway during a low speed collision (e.g., <10 mph) in order to enhance the compliance of the front end of the vehicle for pedestrian protection. Despite achieving this result, a consequence of such an approach is that the headlamp (which is a fairly expensive component) may become damaged on nonimpact side as well depending on stack-up and loading caused by the breakaway feature, and may also cause damage as a result of engaging rearwardly located components in the surrounding compartment once the headlamp is broken away from its mounting in low speed collisions. The closures, such as the fender and door (which are typically even more expensive components, and appreciably more difficult and costly to repair or replace), may also be damaged as a consequence of the impact.

Thus, a need is identified for a vehicle that may provide for the desired front end compliance, such as by allowing the headlamp to breakaway from its mounting, while avoiding the problems associated with causing damage to the other side headlamp or surrounding components and, in particular, portions of the vehicle frame or body that may be costly to repair.

SUMMARY

In accordance with the purposes and benefits described herein, an apparatus for protecting against damage to a vehicle during a low speed collision is disclosed. The apparatus comprises a headlamp adapted to breakaway and move (primarily rearwardly relative to a travel direction, but also potentially in a lateral direction) to provide the vehicle with front end compliance during the low speed collision. A compressible stopper is also provided for engaging the headlamp during the movement once unmoored from the mounting.

In one embodiment, the compressible stopper comprises a foam block. The compressible stopper may include a front face spaced from a rear portion of the headlamp. An upper body component forming part of the vehicle frame may support the stopper. A bracket may also be provided for connecting to the stopper block and the upper body component.

In one particular embodiment, the stopper may be adapted for positioning in a gap between a shotgun beam (upper front structure) of the vehicle and a rear face of the headlamp. A support for supporting the headlamp may also be provided, such that the headlamp may breakaway (to enhance the pedestrian protection compliance) and engaging the stopper during the low speed collision. The stopper may be a height sufficient to engage the headlamp during rotation of the headlamp as a result of the low speed collision.

A further aspect of the disclosure relates to a vehicle including a headlamp located adjacent to a front end of the vehicle and a vehicle frame member located rearwardly of the headlamp. A stopper is positioned in a gap between the body component and a rear face of the headlamp. The stopper may simultaneously engage the headlamp to help prevent damage to the headlamp or the vehicle during the low speed collision.

The stopper may comprise a foam block secured adjacent to a forward end of the frame member. A bracket may also be provided for supporting the foam block. The frame member comprises a shotgun beam supported by a hinge pillar for supporting a vehicle door. In one embodiment, the stopper is not connected to the headlamp, and may be spaced from one of the frame member or the stopper. The stopper may have a height sufficient to engage the headlamp during rotation of the headlamp as a result of the low speed collision.

According to a further aspect of the disclosure, a method of protecting against headlamp causing further damage to vehicle components including closures as a result of a low speed collision in a vehicle. The method comprises providing a stopper for simultaneously engaging the headlamp and a structural portion of the vehicle in a rearward path of travel of the headlamp during the low speed collision. The providing step may comprise positioning the stopper in a gap between the portion of the vehicle and the headlamp. The providing step may additionally or alternatively comprise providing a foam block for simultaneously engaging the headlamp and the structural portion of the vehicle.

In the following description, there are shown and described several preferred embodiments of a stopper for protecting against headlamp causing further damage in low speed collisions. As it should be realized, the arrangement is capable of other, different embodiments and its several details are capable of modification in various, obvious aspects all without departing from the stopper for protecting against headlamp movement as a source of damage, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the stopper for protecting against headlamp damage and, together with the description, serve to explain certain principles thereof. In the drawing figures.

Reference will now be made in detail to the present preferred embodiments of the vehicle with a stopper for protecting against the headlamp causing further damage during a low speed collision, examples of which are illustrated in the accompanying drawing figures.

DETAILED DESCRIPTION

Figure 1:
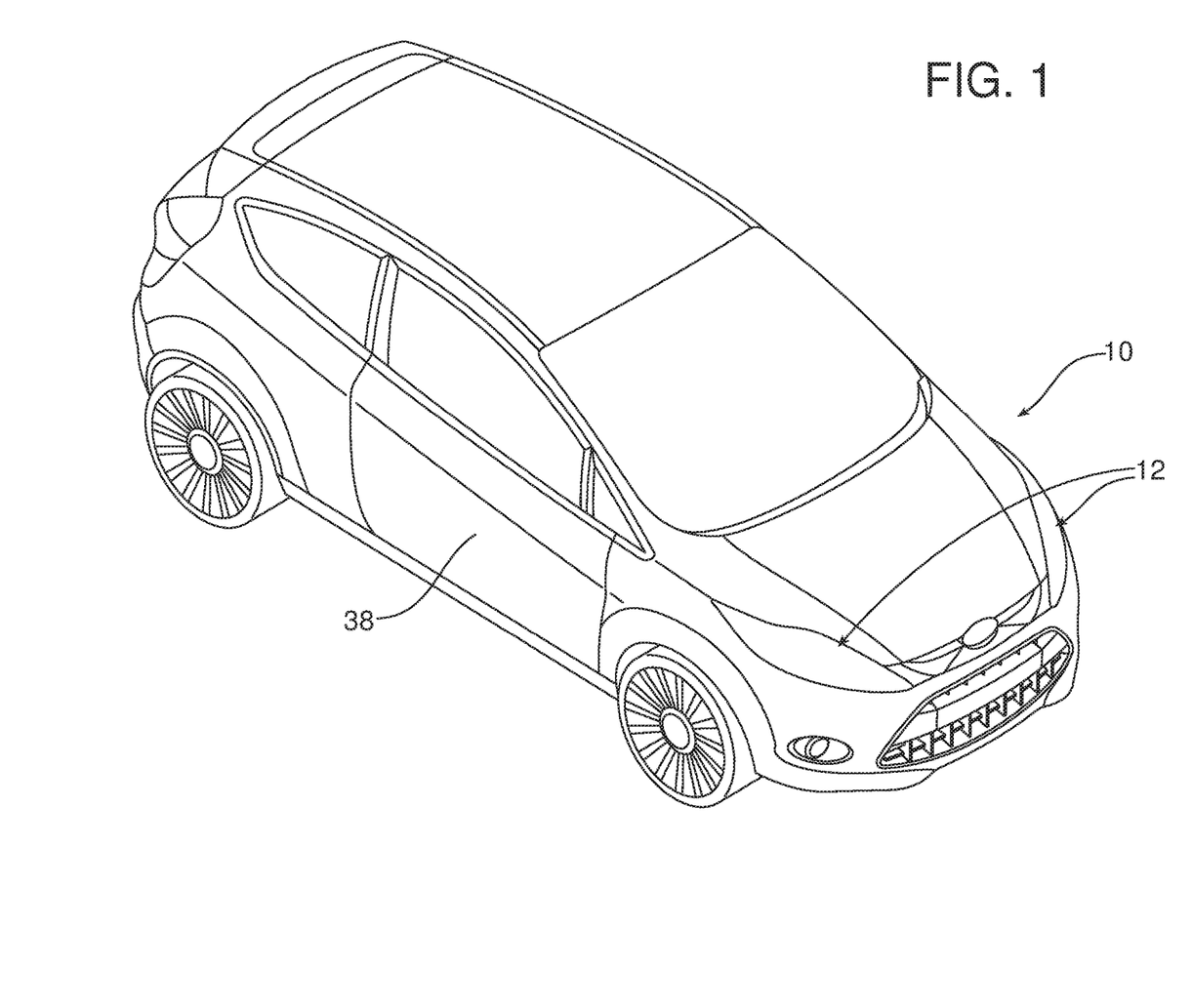
FIG. 1 is a front perspective view of a motor vehicle including a headlamp assembly.

Reference is now made to FIG. 1, which illustrates a vehicle 10 including a pair of headlamp assemblies 12. As perhaps best understood with reference to FIG. 4, each headlamp assembly 12 includes a headlamp 14 for producing light that projects through an associated transparent or translucent lens 16, which forms part of the front end of the vehicle 10. The headlamp 14 extends rearwardly from the front end into a compartment covered by the vehicle hood 18. This compartment also includes other components, such as the vehicle engine (not shown), and portions of the vehicle body, such as a frame member in the form of an upper beam 20 elongated in the travel direction (which is sometimes called the "shotgun" beam).

Figure 4:
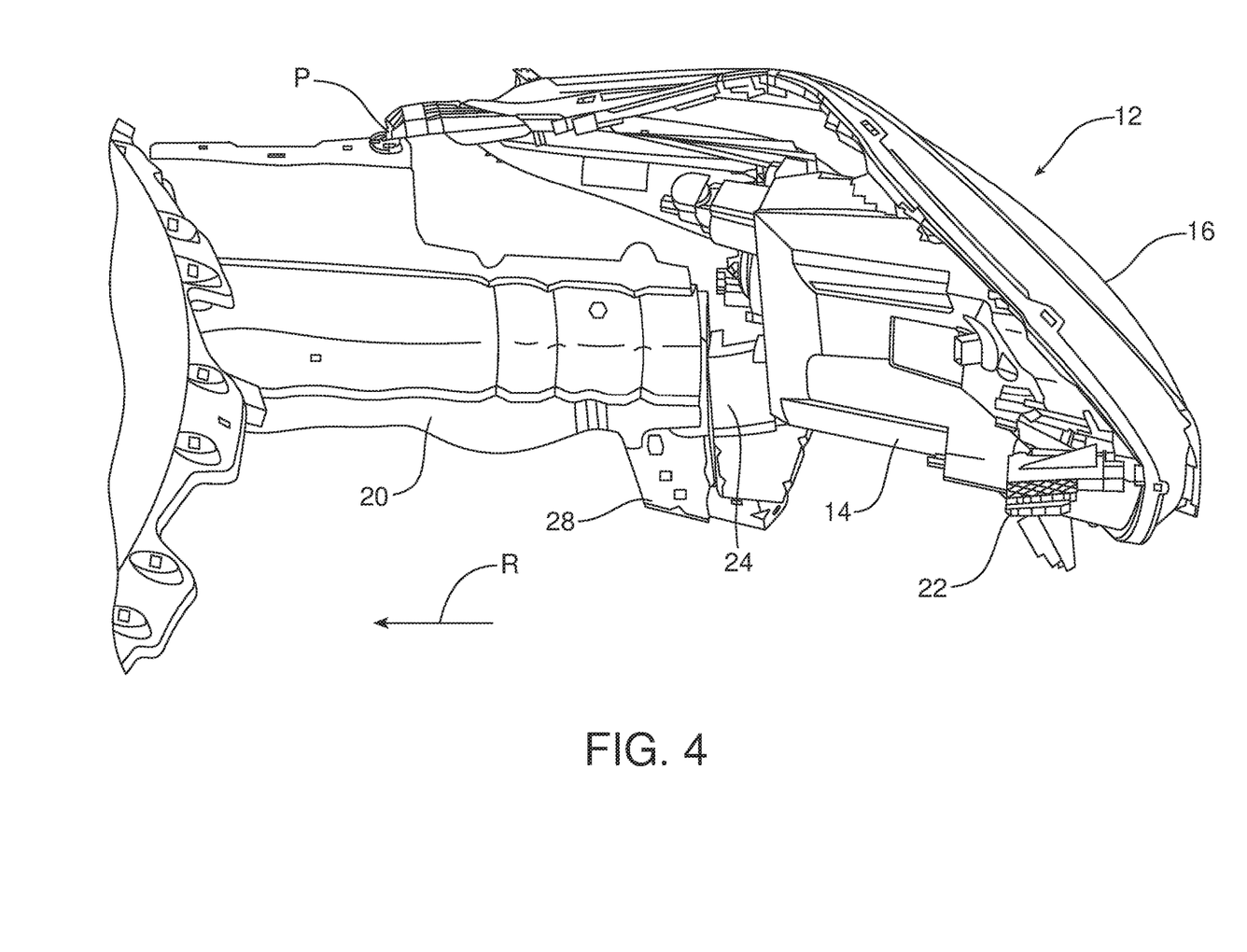
FIG. 4 is an interior side view illustrating the manner in which the stopper engages the headlamp during a low speed collision.

As noted above, the headlamp 14 may be mounted in position in the compartment so as to breakaway in the event of a front end collision to provide a measure of compliance (note mounting tab 22 in FIG. 4). In order to prevent the headlamp 14 from becoming damaged or damaging other components of the vehicle 10, a stopper 24 may be provided for engaging the headlamp 14 once unmoored from its mounting and moved rearwardly or laterally, such as the result of the force generated during a collision. In the illustrated embodiment, the stopper 24 comprises a solid, compressible piece of material, such as a foam block 26, which may be arranged directly in the rearward path of travel of the headlamp 14 during the low speed collision.

Figure 2:
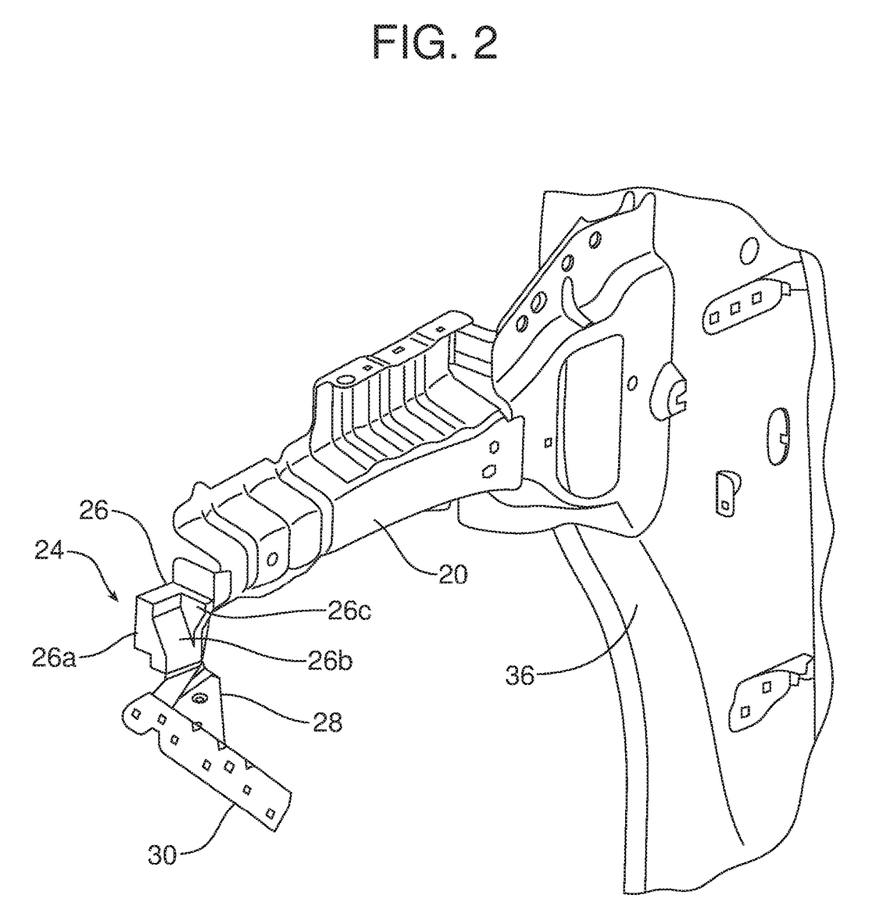
FIG. 2 is a partially cutaway front perspective view of one embodiment of the stopper mounted adjacent to a front end of a shotgun beam.
Figure 3:
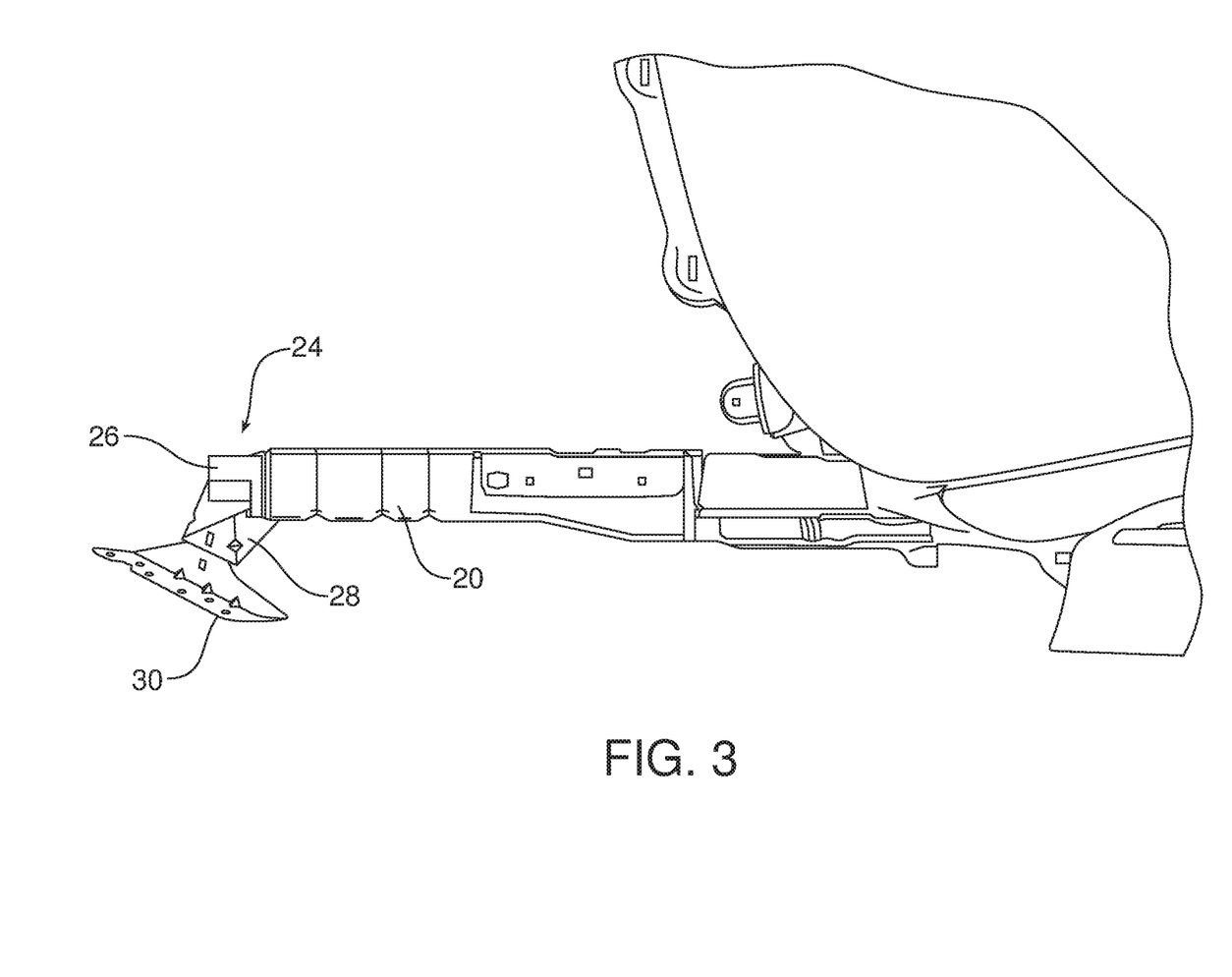
FIG. 3 is a top view of the FIG. 2 arrangement.
Figure 5:
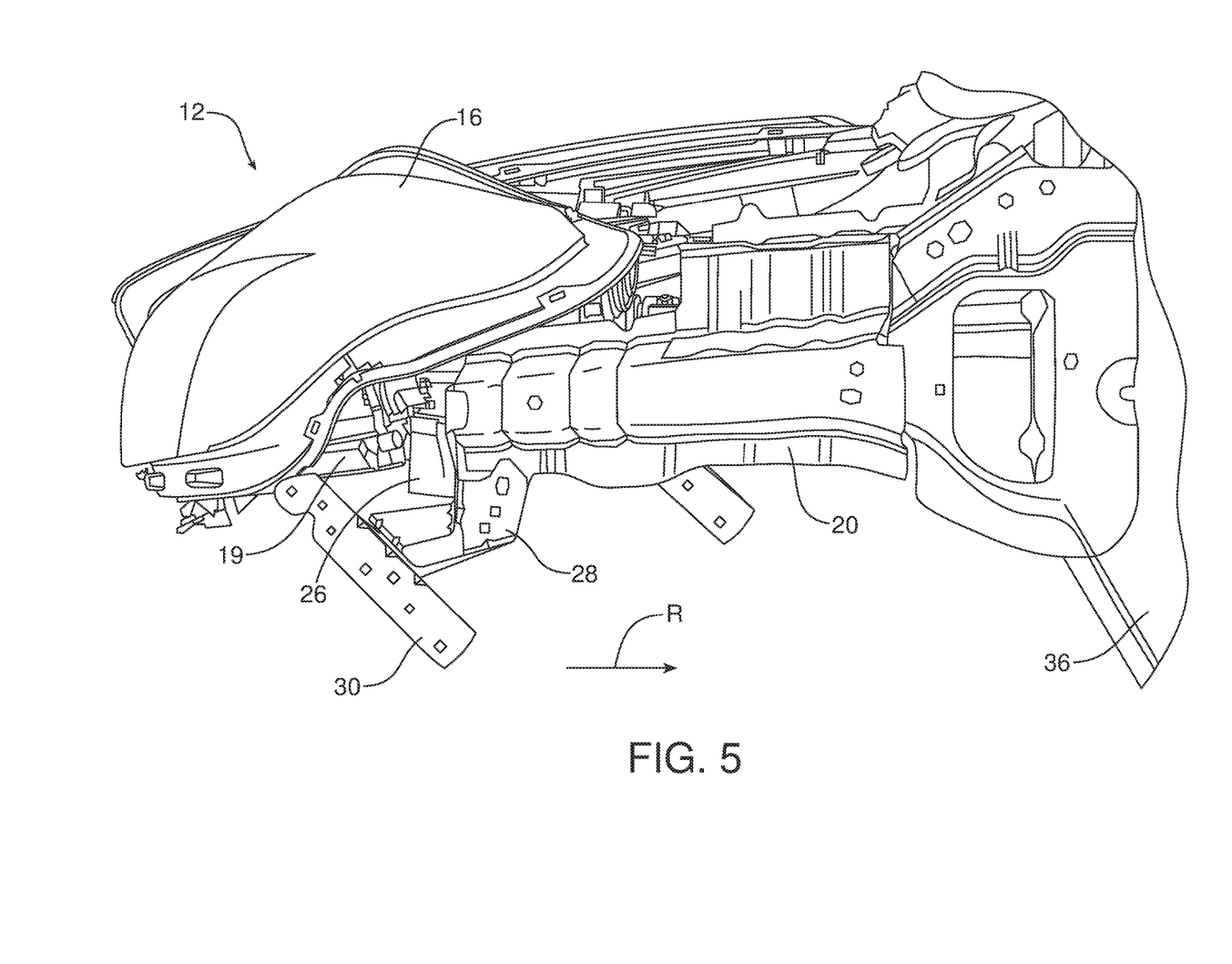
FIG. 5 is an exterior side view of the FIG. 4 arrangement.
Figure 6:
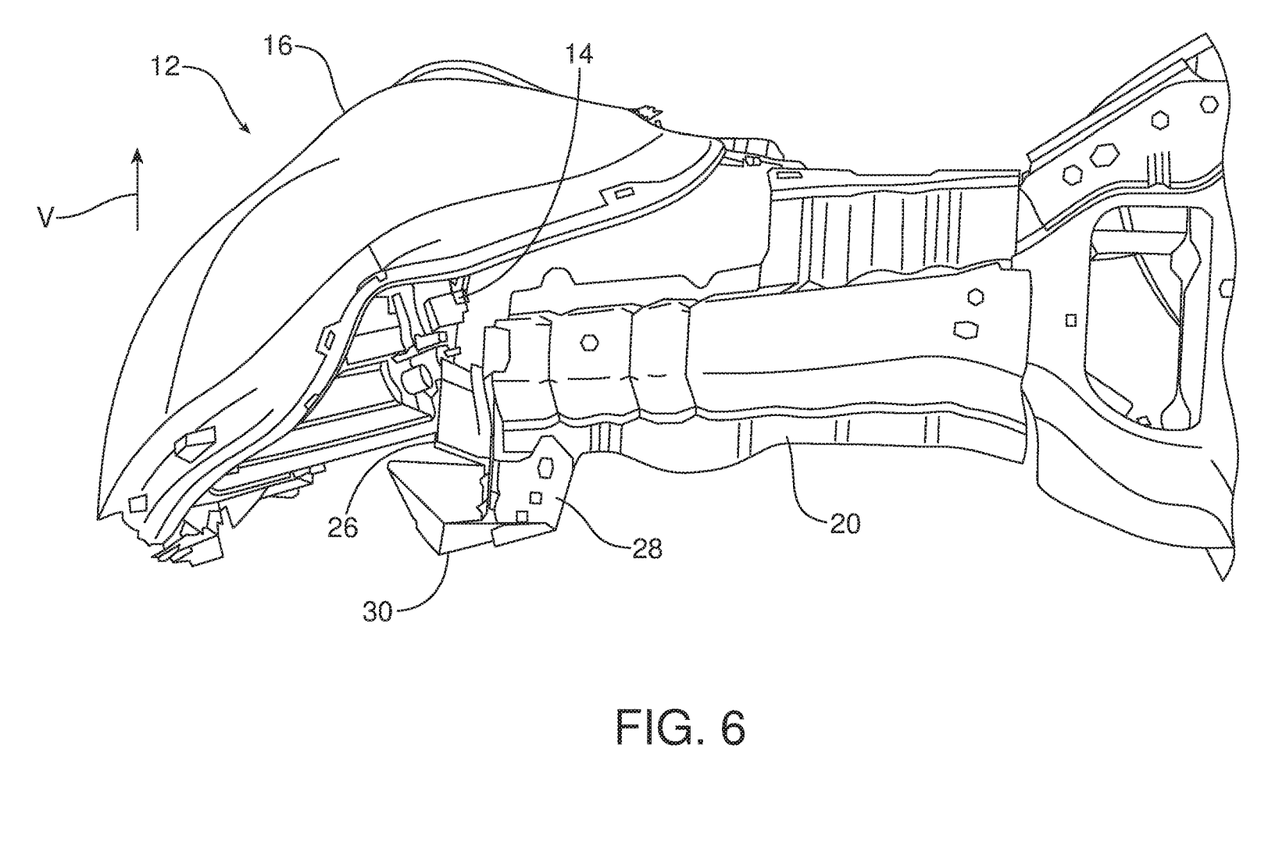
FIG. 6 is a similar exterior side view.
Figure 7:
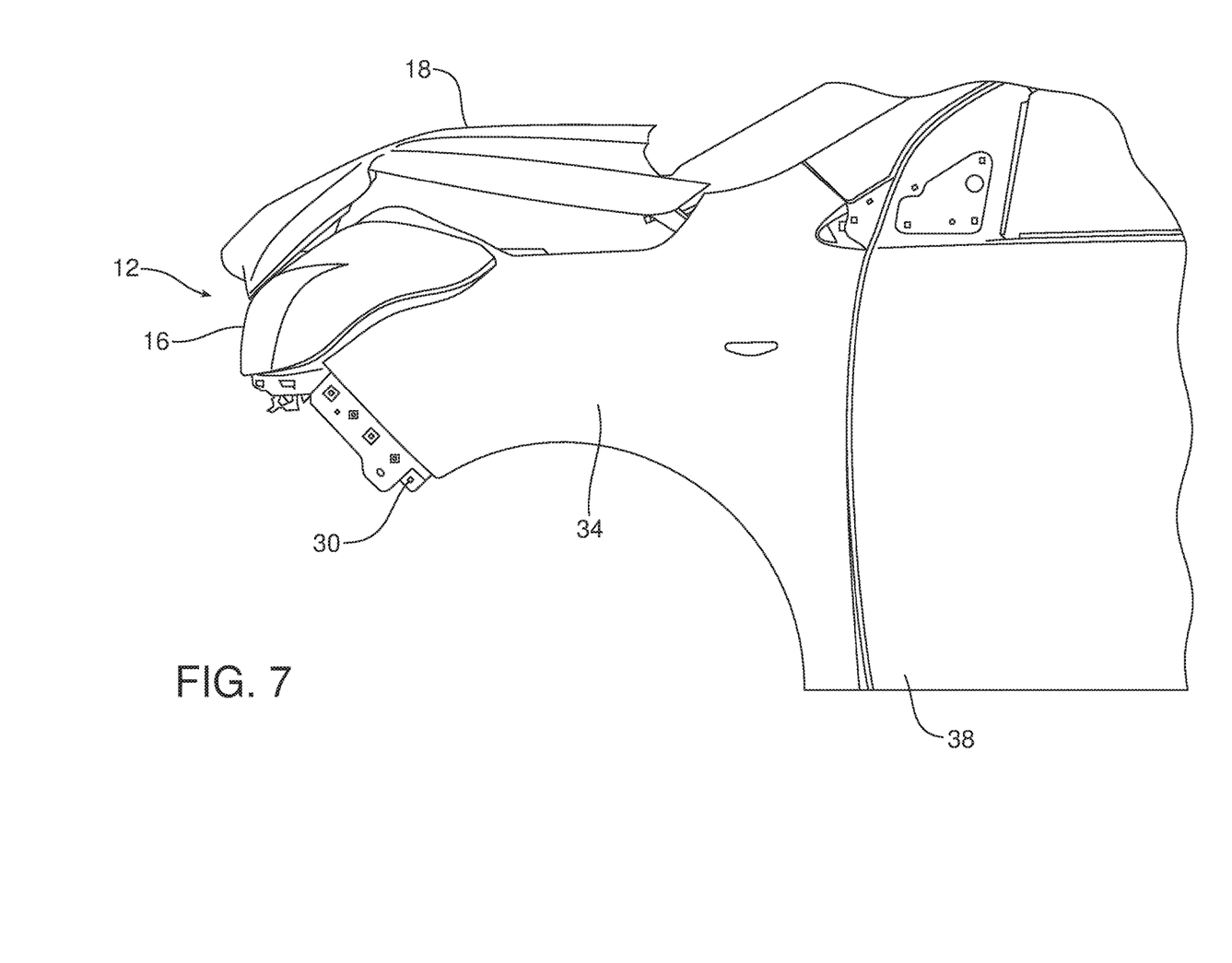
FIG. 7 is an exterior side view including the vehicle fender covering the stopper and the shotgun beam of FIG. 6.

The block 26 may be secured to a support, such as a bracket 28 as indicated in FIGS. 2, 3 and 4. This bracket 28 in turn is proximate the upper front structure, such as adjacent to an upper "shotgun" beam 20, at one end and may engage another support or bracket 30 at the other end (see FIGS. 5 and 6). This second bracket 30 may also support the side front fender 34 of the vehicle 10, which may be adjacent to a door 38. However, it is also possible to secure the block 26 to the headlamp 14 itself, or to other components besides a vehicle frame member, depending on the particular vehicle architecture involved.

With continued reference to FIGS. 4, 5, 6, and 7, the functioning of the stopper 24 during a front end collision can be understood. The resulting compressive force on the headlamp assembly 12 (note crumpling of lens 16 as a result of the impact force and the connection to the shotgun beam 20, such as at point P) causes the headlamp 14 to move in a rearward direction R. As the stopper 24 is positioned directly behind the headlamp 14, it is compressed due to the resulting engagement, and thus prevents the headlamp from being damaged as a result. It can also be seen that the headlamp 14 may rotate in a vertical direction V as a result of the impact, and the stopper 24 may be oversized and thus of a height sufficient to engage the headlamp during this rotation so as to help prevent it from causing unwanted damage to itself or other surrounding components of the vehicle 10.

Consequently, the headlamp 14 is prevented from directly engaging the fender 34, which interfaces peripherally with the front end of the vehicle. This measure of prevention may avoid resulting damage to the fender 34 (see FIG. 7). This may include damage that might otherwise result from the compressive force that would result on the hinge pillar 36 adjacent to the door 38 (see FIGS. 1, 5 and 7).

Turning back to FIG. 2, the block 26 serving as the stopper 24 in the illustrated embodiment is shown as having a generally planar vertical front face 26a, a sloped side face 26b, and an oversized rear portion 26c for positioning adjacent to the shotgun beam 20. The attachment to the bracket 28 may be made by a suitable mechanical fastener or an adhesive, but the arrangement should be secure in order to maintain the stopper 24 in the path of the headlamp 14 when moving rearwardly. While a particular shape and dimension of the block 26 is illustrated, it should be appreciated that other forms may be used and that the particular embodiment shown is not intended as limiting the inventive concept to any particular form.

As can be appreciated, while only one stopper 24 is shown, a similar stopper may also be provided for the other headlamp assembly 12 typically present (see FIG. 1).

In summary, numerous benefits are provided by providing a vehicle 10 with a compressible stopper 24 for engaging a headlamp 14 in the event of a low speed collision. The stopper 24 may comprise a foam block 26 mounted in the rearward path of the headlamp 14, which may be designed to breakaway from its mounting (tab 22) in the event of such a collision. As a consequence, damage to an opposite side headlamp or caused by a headlamp 14 in the event of a low speed front end collision is prevented, thus potentially avoiding expensive repairs (which advantageously may result in the vehicle 10 having an improved rating for insurance purposes, thus reducing the cost of ownership to the consumer).

The foregoing has been presented for purposes of illustration and description. It is not intended to be exhaustive or to limit the embodiments to the precise form disclosed. For instance, the stopper 24 could be shaped such that it does not allow any lateral movement of the breakaway headlamp as well thereby helping to prevent any unwanted lateral movement via front bolster causing damage to the non-impact side headlamp. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for protecting against damage to a vehicle during a low speed collision, comprising:
    a headlamp adapted to breakaway and move from a mounted position provided by a mounting tab; and
    a compressible stopper for engaging a rear face of the headlamp during the movement from the mounted position, wherein the compressible stopper includes a foam block having a sloped side face, and a rear portion oversized relative to a front portion.

2. The apparatus of claim 1, wherein the foam block further has a generally planar vertical front face.

3. The apparatus of claim 1, wherein the compressible stopper comprises a front face spaced from the rear face of the headlamp.

4. The apparatus of claim 1, further including an upper body component for supporting the compressible stopper.

5. The apparatus of claim 4, further including a bracket for connecting to the compressible stopper and the upper body component.

6. The apparatus of claim 1, wherein the compressible stopper is adapted for positioning in a gap between a shotgun beam of the vehicle and the rear face of the headlamp.

7. The apparatus of claim 1, wherein the stopper is of a height sufficient to engage the headlamp during rotation of the headlamp as a result of the low speed collision.

8. A vehicle including a plurality of the apparatuses of claim 1.

9. A vehicle, comprising:
- a headlamp having a mounting tab, a front face, and a rear face;
- a vehicle frame member located rearwardly of the headlamp; and
- a stopper positioned in a gap between the vehicle frame member and the rear face of the headlamp for simultaneously engaging the rear face of the headlamp and the vehicle frame member to help prevent damage to the headlamp or the vehicle during a low speed collision, wherein the stopper includes a foam block having a generally planar vertical front face, a sloped side face, and a rear portion oversized relative to a front portion.

10. The vehicle of claim 9, wherein the foam block is secured adjacent to a forward end of the vehicle frame member.

11. The vehicle of claim 9, further including a bracket for supporting the foam block.

12. The vehicle of claim 9, wherein the vehicle frame member comprises a shotgun beam supported by a hinge pillar used for supporting a vehicle door.

13. The vehicle of claim 9, wherein the stopper is not connected to the headlamp.

14. The vehicle of claim 9, wherein the stopper is spaced from one of the vehicle frame member or the rear face of the headlamp.

15. The vehicle of claim 9, wherein the stopper has a height sufficient to engage the headlamp during rotation of the headlamp as a result of a low speed collision.

16. The vehicle of claim 9, wherein the headlamp is adapted to breakaway from the mounting tab.

17. The vehicle of claim 9, wherein the stopper is secured to the headlamp.

* * * * *